(12) United States Patent
Binnig et al.

(10) Patent No.: US 6,738,513 B1
(45) Date of Patent: May 18, 2004

(54) FRACTAL PRODUCTION OF DARWINIAN OBJECTS

(75) Inventors: Gerd Binnig, Wollerau (CH); Günter Schmidt, Unterhaching (DE); Martin Baatz, Munich (DE); Richard Voss, Ocean Ridge, FL (US); Peter Eschenbacher, Neunkirchen (DE)

(73) Assignee: Definiens AG, Munich (DE)

( * ) Notice: Subject to any disclaimer, the term of this patent is extended or adjusted under 35 U.S.C. 154(b) by 0 days.

(21) Appl. No.: 09/530,174

(22) PCT Filed: Oct. 26, 1998

(86) PCT No.: PCT/EP98/06791

§ 371 (c)(1),
(2), (4) Date: Oct. 30, 2000

(87) PCT Pub. No.: WO99/23603

PCT Pub. Date: May 14, 1999

(30) Foreign Application Priority Data

Oct. 24, 1997 (DE) .......................................... 197 47 161

(51) Int. Cl.[7] .............................. G06K 9/00; G06K 9/46; G06K 9/72
(52) U.S. Cl. ........................ 382/181; 382/190; 382/224; 382/225; 382/226; 382/227; 382/228
(58) Field of Search ................................. 382/224–228, 382/181, 190; 706/13, 20

(56) References Cited

U.S. PATENT DOCUMENTS 5,461,698 A * 10/1995 Schwanke et al. ............. 706/20
5,533,148 A * 7/1996 Sayah et al. ................. 382/240
6,018,728 A * 1/2000 Spence et al. ................ 706/20
6,397,200 B1 * 5/2002 Lynch et al. .................. 706/20

OTHER PUBLICATIONS

You, "Texture class assignment in texscale: an evaluation study", IEEE, Acoustics, Speech, and Signal Processing, 1994; pp.: V/393–V/396 vol. 5.*

Danie, "Using Discriminant Eigenfeatures for Image Retrieval", IEEE, Transactions on Pattern Analysis and Machine Intelligence, 1996; vol. 18.*

Dong, "Adaptive image restoration using a rule–based knowledge system", IEEE, System Engineering, 1989; pp.: 19–22.*

* cited by examiner

Primary Examiner—Samir Ahmed
Assistant Examiner—Brian Le
(74) Attorney, Agent, or Firm—Blakely, Sokoloff, Taylor & Zafman

(57) ABSTRACT

A method for fractal-darwinian object generation consists of the steps of: preparing a fractal object library including predetermined objects and associated rules of property and context, forming objects and comparing the formed objects with the objects in the fractal object library. By using the property rules, a local classification likelihood is allocated to each formed object. Thereupon, by using the context rules for each object, a respective fractal classification likelihood is formed. For optimisation of the fractal classification likelihood, alteration rules are applied to the objects. The above method is carried out iteratively, whereby a process of gradual optimisation takes place.

29 Claims, 1 Drawing Sheet

FRACTAL PRODUCTION OF DARWINIAN OBJECTS

Figure 1:
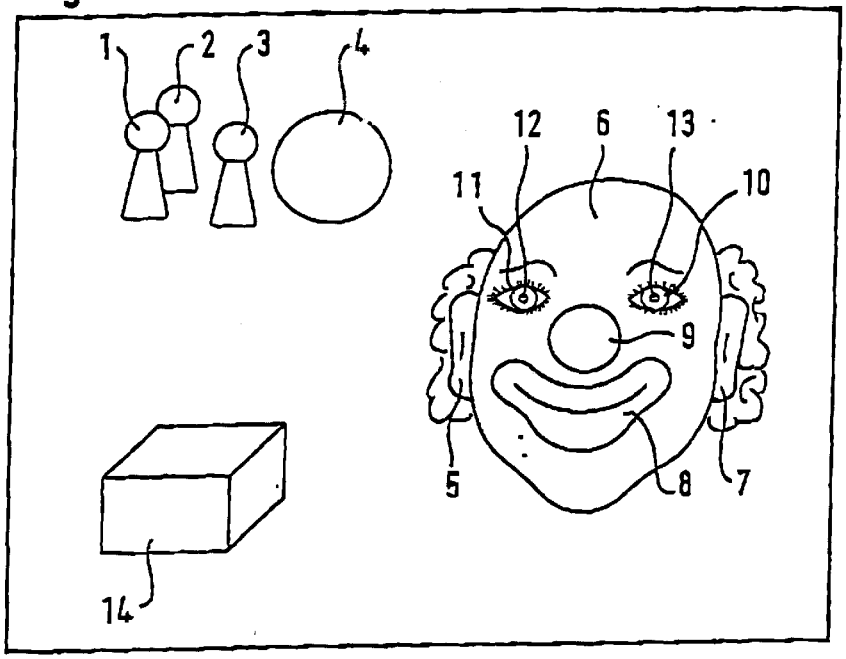

The present invention relates to a method for fractal-darwinian object generation and in particular to a method wherein objects or structures to be examined are acquired in complex contexts, and corresponding objects or structures are generated. Herein both the overall method and the objects as well as their linkages may be considered to be fractal-darwinian.

Darwinian methods, or genetic or evolutionary methods, respectively, are used if the number of possibilities is so high as to preclude calculating all of them. In the presently described method, such genetic or evolutionary optimisation methods are combined with a "multi-scale", fractal manner of proceeding. The interconnection between the "small one and the "large one" is thus dynamically taken into account. The term "fractal" is borrowed from Mandelbrot's fractal geometry while, however, having a different connotation hereinafter. As with Mandelbrot, a sub-object or a substructure resembles the object or structure it belongs to: i.e., the branch resembles the tree. In the method described hereinbelow, the objects might resemble their sub-objects, but generally they will not. Rather, the treatment and description of the objects will be similar for sub-objects and objects.

A like fractal-darwinian object generation is particularly utilised for image recognition or image generation, however may also be employed for speech recognition or speech generation, and in general for the recognition and generation of structures of all kinds presenting a particularly complex overall structure.

Conventional image recognition methods are based, for example, on direct comparison between a structure to be examined (e.g., image or an object within the image) and a structure already stored, which is compared directly with the structure to be examined. What is, however, a drawback in the like image recognition systems is the fact that owing to the direct comparison, on the one hand the structure indeed must be present in a very similar form, or any possible alterations and distortions must equally be tried, and on the other hand the objects frequently can be recognised not due to their properties, but partly or in extreme cases even primarily through their context, which means the close or remote surroundings. In addition, the accuracy and reliability of image recognition or image generation is limited inasmuch as an enormously high demand for storage capacity is required for the comparative structures.

The invention is therefore based on the object of furnishing a method for fractal-darwinian object generation whereby objects in a complex interrelation or having a complex structure which are to be examined may be recognised and imitated at high accurracy reliability.

In accordance with the invention, this object is attained by the measures indicated in claim 1.

Herein a fractal-hierarchical object library including pre-determined objects stored therein and presenting associated rules of property, context and alteration is used. The property rules describe the object, the context rules describe the relations between the objects (hierarchical and non-hierarchical relations), and the alteration rules describe the changes of the objects due to their properties and/or relations. Initially basic objects having subordinate and superordinate objects are hierarchically formed with relative formal algorithms, or generated from the complex structure of hierarchical basic structures to be examined, respectively. These basic objects are subsequently compared with the objects of the fractal object library, with a local classification likelihood being associated to each basic object by means of the property rule of the corresponding object in the object library. Thereupon further context rules are applied to the respective objects, wherefrom global or fractal classification likelihoods result. Finally, the fractal classification likelihoods of the basic objects are optimised in accordance with alteration rules. This method is performed repeatedly in order to improve the classification likelihoods.

In particular, in the step of forming the basic objects a method for iterative segmentation of basic elements may be utilised by taking into account relative formal homogeneity criteria (e.g., similar color, color fluctuation, etc.), resulting in particularly rapid object generation.

Moreover the fractal object library may present alteration rules encompassing prescriptions for an alteration—with alteration in the present instance denoting a change e.g., the propagation of the pattern or object (e.g., owing to more or less purposeful changes of shape)—or a comminution of an object, with generation of the subordinate and superordinate objects taking place in accordance with the growth rules and the amount of the respective classification likelihood.

Preferably objects are generated by fusing or founding, wherein the substructure is either dissolved or maintained. The generation of subordinate objects from basic objects or superordinate objects takes place by means of comminution or by means of known segmentation methods.

Preferably unknown and constantly recurring objects obtained, for example, during segmentation but not possessing a corresponding object in the fractal object library, may be included in the fractal object library together with associated rules of property, context and/or alteration. Hereby the so-called "wealth of experience" for the method may be expanded at will.

The property rules in the object library, which pertain to a particular object, set the properties of a particular object. For the case of image recognition or image generation, for example the shape, density and/or color of a particular object determine its properties. In speech recognition or speech generation, these properties may also be set in the form of pitch, tone, rhythm, etc. The context rules may consist of internal and external context rules, with the internal context rules determining a relation between equivalent objects within a same hierarchy. The objects may originate both from a common superordinate object and from different superordinate objects. The external context rules usually determine a relation between the subordinate and superordinate objects. Upon use of several hierarchical object structures among each other, the external context rules may, however, also determine a relation of objects within the hierarchical object structures existing in parallel.

Preferably the repeated execution of the method steps is terminated when the classification likelihood for the entire object to be examined has exceeded a particular threshold. As an alternative, the repeated execution of the method may also be terminated when a substantially stable overall object has been generated.

Figure 2:
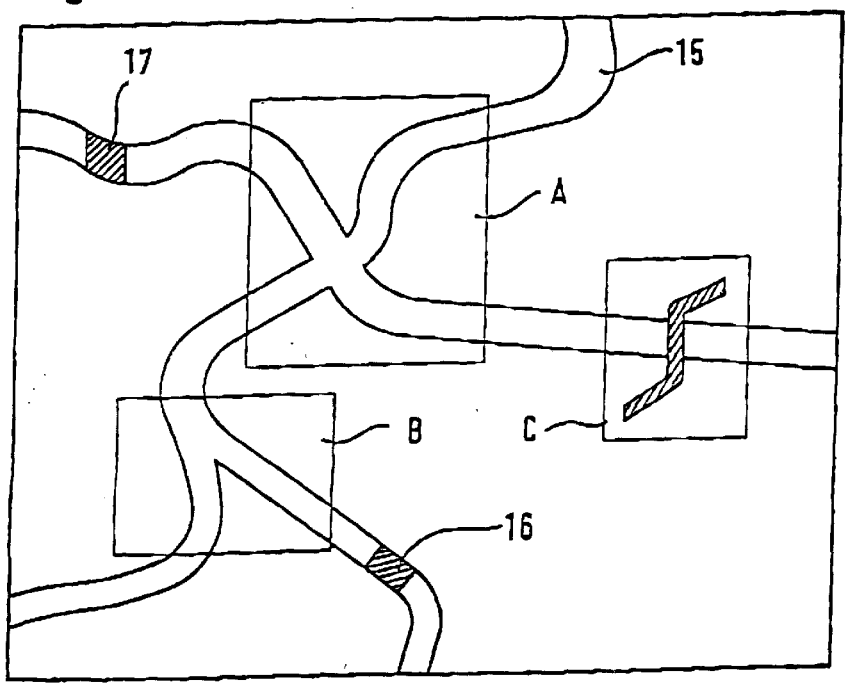

A detailed description of the invention is hereinbelow given through embodiments by referring to the drawing, wherein:

FIG. 1 is a schematic representation, of a complex image to be examined, whereby the method according to the invention is described with respect to an image generation, and FIG. 2 is a schematic representation of a satellite photograph, whereby the correction capacity of the method according to the invention is explained.

At first, the basic reflections forming the basis of the invention shall be discussed in a generalised manner.

Herein two-dimensional images, which are considered to be the complex structure to be examined or objects having a complex interrelation, shall be taken into consideration exclusively. The like structures to be examined may, however, also be connotational contents present in language, in moving images or in texts.

When looking at a picture, for example, a human observer, where familiar with the topic, will very soon be capable of recognising objects. How this is achieved by man is related with his life experience, however is not understood yet in its full depth. An image segmented by a computer, i.e., divided into single object segments, will as a general rule generate objects having not too much in common with the desired objects as recognised by man.

In the method described in the following, the recognition and generation of an image, for example, is understood to be a multi-scale or fractal and evolutionary or darwinian process. The single objects of an image are herein treated as a kind of independent "creature" which are very vague, formal and unrealistic at the beginning of the method, however upon repeated execution of the method change and become more concrete to the effect of better and better adapting to a library of known objects forming, as it were, the computer's wealth of experience.

Herein the objects are structured hierarchically. Large or superordinate objects are thus split up or disintegrated into sub-objects or subordinate objects, while small or subordinate objects are combined into large or superordinate objects. The method for adaptation of the objects to the object library thus takes place on several planes (scales). In comparison with the object library for this adaptation, on the one hand property rules for the objects, and on the other hand context rules between the objects and hierarchical structures are of importance.

For the optimum adaptation of any objects and structures in order to generate the most meaningful solution, evolutionary algorithms are employed. Use is made, i.a., of the general darwinian mechanisms briefly described hereinbelow:

Isolation, attraction

In accordance with the present invention, isolation is understood to designate the delimitation of partial regions, for example of an image to be examined, from objects. This may be effected by splitting up or disintegration or segmentation according to particular algorithms. Preferably for segmentation a method is used wherein the similarity or pertinence between picture elements and picture segments is determined while taking homogeneity criteria into consideration. Vice versa, the small objects or subordinate objects may also be combined into large or superordinate objects. In this case, limitation of this grouping to a particular number of group members corresponds to isolation. For example, a hierarchical object structure may be generated largely in the absence of previous knowledge and thus lead to a hierarchical abstraction of any given set of data by combining smaller objects into larger objects, where the application of a homogeneity criterion leads to a value situated below a threshold. As a homogeneity criterion it is, for example, possible to employ the difference of the heterogeneity h weighted by the size of an object newly created by fusion or foundation, and the sum of the heterogeneities of the original objects $h_1$ and $h_2$, respectively weighted by the respective sizes $n_1$ and $n_2$, respectively. The difference $\Delta h_{weight}$ of the weighted heterogeneities after and before, i.e., the heterogeneity introduced by combination of two objects, results from the equation $$\Delta h_{weight} = (n_1+n_2)h_{new} - (n_1h_1+n_2h_2),$$

wherein this difference should be as small as possible.

Of any pairs of objects which may potentially be considered for a fusion or foundation, in particular always those are combined first which have the smallest difference of weighted heterogeneity introduced by the fusion or foundation. Where the difference of the weighted heterogeneity divided by the overall size ($\Delta h_{weight}/.(n_1+n_2)$) is situated below a predetermined threshold, objects are fused in the combination. A new superordinate object in turn is founded while maintaining, which means storing in the object library, the smaller objects, i.e., foundation of a new superordinate object, if this difference of the weighted heterogeneity divided by the overall size is situated above a predetermined threshold. A subordinate object potentially exchangeable between two objects will actually always be relocated if the weighted heterogeneity of the two objects will be reduced by this exchange or this relocation in accordance with the equation, $$h_{weight\ after} < h_{weight\ before} \rightarrow n_{1after}h_{1after} + n_{2after}h_{2after} < n_{1before}h_{1before} + n_{2before}h_{2before}.$$

Thus a hierarchical object structure is generated from basic objects by foundations, disintegration, fusion, dissolution, subordination, exclusion from a group and re-grouping of objects. Herein a foundation involving the generation of superordinate objects is contrasted by disintegration for the generation of subordinate objects. Fusion for the generation of larger objects from a multiplicity of small objects is contrasted with dissolution for the generation of smaller objects from a large object. In subordination, objects are gathered and subordinated to a superordinate object. In contrast, in exclusion from a group, a subordinate object is expelled from a superordinate object. In re-grouping, an exchange of subordinate objects takes place.

The respective objects may have special relations with other group members. These relations or context rules are also referred to as attraction. In static images, attraction, or the relation in particular patterns, may find an expression in characteristic relative distances, size proportions or angles. In addition, each object is allotted predetermined properties reflecting, for example, its geometrical shape in n-dimensional space in a condensed manner, color distribution etc.

Alterations

It has already been mentioned that in a first run of the method, it is often not clearly definable what regions of a complex entity may meaningfully be termed an object. Splitting up or composition, respectively, into objects from these regions is therefore performed in an iterative manner. Accordingly, objects are at first generated preliminarily and later on iteratively modified increasingly purposefully. Objects are changed by excluding regions therefrom, for example subordinate objects, or incorporating adjacent regions, for example adjacent objects. Another manner of alteration is the change of the attractions or context rules, respectively.

A local alteration of an object might be considered a mutation. As there are, however, various possibilities of alterations apart from the local alteration, the general term alteration shall be used.

Selection, fitness

The purpose of altering the respective objects is to optimise their "fitness" or "classification likelihood" with respect to the object library. The measure for their fitness or classification likelihood is assumed to be the similarity of their bundled properties with the properties of objects of the prepared object library. In the object library, a multiplicity of possible objects including their possible properties or property rules are stored, which are clearly more objects than in the object (e.g., image) under examination.

In addition, possible mutual relations or context rules of the objects, that is to say their attraction, may be described in the object library. The objects or structures found in the image will then also have a more or less high similarity, i.e. classification likelihood, with the possible attractions or context rules of the corresponding objects in the object library.

Variety, mating

As a long-term memory it is further possible to employ variety of objects and object structures. That is to say, not only the absolutely best (highest classification likelihood) of these objects or structures will hold up or be further used, but also less good objects (lower classification likelihood). As a result, possibilities once found but presently constituting second-class options sill not immediately be lost. This variety represents a memory for second- or third-class options. This is sensible inasmuch as what is second-class now may be superior in a later development phase. The variety of the possibilities of solution moreover provides, apart from mutation, for another type of alteration. This further type of alteration is referred to as "mating" or mixing and combination of different structures of solution.

Reproduction

In nature, through reproduction of a "successful" creature, the numbers of this type of creature are increased. This increases the import of the particular genetic code as it is then enabled to take effect in parallel in two locations. At first glance, an analogy for the objects in object generation with a sequentially working computer does not make sense. In a dynamic system, however, this may at second glance be quite useful even if it is a matter of one and the same approach to solution, or involves the same object. In a dynamic system, the surroundings of objects change. Therefore the importance of an object in object recognition or generation is raised by the fact that the object is treated a larger number of times, and thus the number is virtually increased. Where the reproduced objects are moreover altered, it will often be meaningful to store only one object plus the various alterations.

Deletion

For the number of possible solutions not to increase excessively through reproduction and thus unnecessarily slow down the optimisation process, some of the possible solutions must be deleted.

As the darwinian algorithms are very specific in part, it is not desirable to concurrently apply all possible kinds of algorithms for the entire image to be examined. Rather, it is sensible to start with very general, formal algorithms at the beginning of the method or Revolution", respectively. Through comparison with the object library a first level of cognition is attained herein, which may be used in order to utilise algorithms or alteration rules more purposefully. Hereby the classification likelihood, or fitness, may possibly be raised. Preferably algorithms may be used even more purposefully to result in increasingly sophisticated objects having individual meanings and an increasingly higher fitness or classification likelihood.

In the following, the multi-scale feature of the method according to the inventionen shall be discussed in detail, which plays an important role for the analysis of complex structure's.

The similarity of an object of the item or image to be examined with the one of an object of the object library corresponds to a local fitness, or local classification. likelihood. This local classification likelihood by itself is, however, not sufficient, inasmuch as ambiguity may furthermore also exist in the case of objects already having a very high fitness or classification likelihood, which means that a similarly high local fitness or classification likelihood with several objects of the object library exists. The meaning of a respective object will then often only become clear through its context rules or the structure of its subordinate objects.

Multi-scale, i.e., fractal manners of examination are therefore indispensable. The fractal treatment of a structure to be examined, for example of an image, thus requires a fractal-hierarchical object library, a fractal fitness or classification likelihood, a fractal alteration, and possibly fractal reproduction and fractal deletion. The fractal object library is a library having stored in it not only the properties or property rules of objects, but also the possible internal and external relations (internal and external context rules) as well as the alteration rules thereof. This means that in the fractal object library it is also stored of what possible subordinate objects the object may consist, including the possible relations of these subordinate objects, and what relations or contexts with superordinate objects the object may have. This consequently also involves hierarchical information, for the object is generally embedded in larger contexts and constituted of subordinate objects having their particular relations. From this hierarchical structure it is possible to determine a hierarchical or fractal fitness or classification likelihood by comparison with the hierarchical structures in the library.

Starting out from the local fitness or classification likelihood resulting from direct comparison of the object with the objects of the object library, a fractal fitness or classification likelihood composed of the local and hierarchical fitness is calculated based on this local fitness. By way of the alteration, these fractal classification likelihoods are then optimised.

In the following, the above described rules having general validity shall now be applied to preferred embodiments.

FIG. 1 shows a schematic representation of an image to be examined which substantially corresponds to a fractally generated overall object.

Reference numerals 1, 2 and 3 designate game pins, whereas reference numeral 4 represents a ball. In the hierarchical structure of the method according to the inventionen, the pins and the ball might be subsumed under the generic term, or superordinate object, of "toys". Reference numerals 5 and 7 designate the ears of a clown. Reference numerals 8 and 9 designate the clown's mouth and nose. The eyes are designated by reference numerals 10 and 11, whereas the pupils are designated by reference numerals 12 and 13. All of the above described objects are stored in a prepared fractal object library and therefore recognisable. Reference numeral 14 designates a parallel-epipedic body not existing yet in the fractal object library.

Apart from the above described objects, the fractal-hierarchical object library moreover includes associated rules of properties, context and alteration, which determine the properties of the respective objects, the relations among each other or with subordinate and superordinate objects, and the possible alterations of the object. In the fractal object library there might, for example, the objects 5 to 13, i.e., ears, head, mouth, nose, eyes and pupils be combined into the superordinate object "clown's face" which may in turn have a particular relation or context with the superordinate object "toys". A fractal-hierarchical object library having such structure thus is composed of a multiplicity of hierarchically arranged objects having associated property rules, context rules and alteration rules.

At first, basic objects are formed in the structure to be examined, or image. In this first embodiment in accordance with the invention, these basic objects correspond to the objects 1 to 14. The formation of these basic objects may, for example, be effected through iterative segmentation of basic elements (pixels) while taking homogeneity criteria into consideration. It is, however, also possible to use another method as described in the chapter "Isolation". As an alternative, however, formation of these basic objects may already take place by taking into account the fractal object library, wherein, for example, a predetermined color is associated with a quite particular object having a very high fitness or classification likelihood.

Normally, however, for reasons of time, initially an iterative segmentation is performed, after which the hierarchical basic structure thus obtained including basic objects is compared with the objects of the fractal-hierarchical object library. If the basic object is not found in the object library, it will be evaluated to be unknown, as is the case with object 14. The objects 1 to 13 which are known in the fractal-hierarchical object library, in contrast, are classified and provided with a local fitness or local classification likelihood in accordance with the conformity of their properties with the properties of the object library. The following Table shows an exemplary classification of the objects in accordance with FIG. 1.

TABLE I

| Item | Object | Local fitness (property rule) | Fractal fitness (context rule) |
| --- | --- | --- | --- |
| Pin | 1 | 20% | 30% |
| Pin | 2 | 5% | 25% |
| Pin | 3 | 40% | 35% |
| Ball | 4 | 80% | 70% |
| Ears | 5 | 40% | 45% |
| Ears | 7 | 45% | 50% |
| Kopf | 6 | 30% | 40% |
| Mouth | 8 | 25% | 38% |
| Nose | 9 | 35% | 45% |
| Eyes | 10 | 75% | 85% |
| Eyes | 11 | 74% | 85% |
| Pupils | 12 | 50% | 65% |
| Pupils | 13 | 52% | 65% |
| unknown | 14 | 0% | 0% |

In the above Table I, the single items or objects are indicated with their respective local and fractal classification likelihoods or fitness values. The local classification likelihoods are obtained by applying the property rules pertaining to the respective object, wherein for example the shape or symmetry, the color or density of the item or object is examined. Depending on conformity with the corresponding property rules, there results a local fitness or a local classification likelihood being a measure for a possible association of the object with a particular item.

As was already described above in connection with the term "variety", not only the absolutely best structures may hold up, but even second- and third-class objects may be preserved in the storage. The following Table shows such a variety of items which may, for example, be associated with object 10.

TABLE II

| Object 10: | 75% eyes |
| --- | --- |
| | 70% ball |
| | 70% pupils |
| | 50% head |

In accordance with the above Table, the nearly circular object 10 may be evaluated or classified at 75% as "eye", at 70% as "ball", at 70% as "pupils" and at 50% as "head". These possibilities of the object 10 classified second, third and fourth represent a so-called variety which will preliminarily remain stored in the iterative execution of the method and enables an increase in the rapidity of the optimisation process during object generation.

In the represented first embodiments, processing is, however, only continued with the best possible item, i.e., the highest classification likelihood for the "eyes" for reasons of simplicity. On the basis of the local classification likelihoods thus determined, in a subsequent step the relations of the respective objects among each other or with subordinate or superordinate objects are taken into account, whereby the local classification likelihoods are modified and fractal fitness values or classification likelihoods for the respective objects result. In Table I, these global classification likelihoods are indicated in the right-hand column. The fractal classification likelihood is calculated from the respective local classification likelihoods and the respective context rules while taking into account the hierarchical structure.

The objects thus generated and having a respective fractal classification likelihood are subsequently optimised by using alteration patterns. After repeated execution of these steps, a classification likelihood is finally obtained for the overall structure to be examined, which allows for nearly error-free and extraordinarily reliable object generation or image recognition.

Apart from the property rules determining the local fitness or classification likelihood of an object through symmetry, shape, color and density of a respective regions, and the context rules setting the fractal fitness or classification likelihood as external or internal context rules through, for example, the size ratio, the distance, the angle etc. of the respective objects among each other, so-called alteration rules or darwinian algorithms may purposefully set the propagation or the alteration, respectively, of particular objects, whereby an acceleration and an improved error freeness of the method is obtained. In the like alteration rules, typical properties of objects may be taken into account, such as e.g., the property that, for example, a river or a road will usually constitute an elongate or linear item in satellite photographs and thus the propagation criteria can advantageously be selected to be different in the transverse and longitudinal directions.

In an image recognition method, isotropic alteration rules are used for area-type objects, and anisotropic alteration rules for linear objects, for example.

Generation of larger objects may be effected either by fusing or by foundation. In the case of fusion, the separation into objects is abandoned, whereby a single new object is formed, wherein the original objects fuse with each other. Herein only a larger object, not however a superordinate one is formed as the subordinate objects, i.e. the fusion partners, have ceased to exist. In the case of foundation, in contrast, the original objects continue to exist, with merely a superordinate object being newly added as a so-called envelope. Objects having more than two sub-objects are generated later on by fusions. At times, however, a fusion may be unsuited, particularly if the objects to be fused have different sizes. In such case a subordination of the smaller one under the larger one might possible be more suitable, i.e., the smaller object becomes one of the subordinate objects of the larger object. In the reverse direction, a comminution of objects is thus effected with relative ease if resulting from a foundation, while possibly a new segmentation will be required if a fusion has taken place. The drawbacks resulting from the complicated comminution of fused objects are offset by the advantages of a decreased demand for storage capacity and faster processing.

In accordance with FIG. 1, reference numeral 14 represents an unknown object. Such an object may subsequently be entered in the fractal object library either automatically or manually and be provided with respective property, context and/or alteration rules. Thus the wealth of experience of the fractal-hierarchical object library is continuously expanded by newly added items, whereby accuracy is further improved for a future object generation.

By way of the objects 10, the enhancement of the classification likelihood owing to taking into account the context shall now be described in detail.

In accordance with Table 1, the object 10 initially merely possesses a local classification likelihood of 75% for the item "eyes". Object 4, on the other hand, possesses a classification likelihood of 80% for the item "ball" and would thus at the outset appear conspicuous as a starting point for further developing the overall object. Due to application of the context rules, where for example an internal interrelation (distance, size) of, "pupil" to "eyes", "eyes" to "nose", "eyes" to "mouth" etc. is taken into account, the fractal classification likelihood for object 10 finally rises to a value of 85% for the item "eyes".

In the above mentioned embodiment, merely the relation of objects within one group or one superordinate object (e.g., head) was considered. It is, however, also possible to consider relations of objects not belonging to a common group (e.g., relation between "eye" and "ball"). In addition, several hierarchical object structures may exist alongside, the objects of which are brought into a relation.

In the above described embodiment in particular spatial relations, i.e., distance, size, of the objects are dealt with in the context rules. It is, however, also possible to deal with the temporal relations of the objects in the context rules, which is of particular importance in speech recognition or generation. It is finally also possible to deal with the relations of the absolute properties, e.g., color, of the objects in the context rules.

FIG. 2 shows a schematic representation of a satellite photograph to be examined, which serves to describe the possibility of correction of faulty object generation.

Reference numeral 15 shows a linear object intersecting in a portion A, branching or merging into a Y shape in a portion B, and being crossed by another strip-shaped object in a portion C. Reference numerals 16 and 17 designate germinal portions or formed basic object.

After application of the property rules to the basic objects 16 and 17, there results for example in object 16 owing to a precise color conformity with the associated property rule, that this object 16 has a 97% classification likelihood of being a "river", while object 17 is evaluated at a mere 91% classification likelihood as a "road". Due to this assumption, object 16 is further developed in accordance with the alteration rules for "rivers", meaning, for example, that a Y-shaped merging with other objects having the same "river" classification, for example in portion B, further increases the classification likelihood of the object for "river". A crossing by a bridge, as is represented in portion C, would accordingly also be in conformity with the alteration rule for rivers and thus not bring about a change in further developing the object 16 as a "river" item.

In developing the object, however, at some point of time the superordinate object "river system" will be formed, according to which it is very well possible that several rivers join a main river. If, however, as is represented in FIG. 2, portion A, the river portions meet nearly perpendicularly, such configuration contradicts a "river system". Such a contradiction of the generated superordinate object with respect to its alteration rule (river) may thus be used as a correction trigger, wherein, starting out from the superordinate object (river system) via the corresponding intermediate objects as far as basic object 16 all associated classification likelihoods in the corresponding group are decreased by a particular amount, for example by 10%. Accordingly, the basic object 16 now possesses a local classification likelihood of 87% for the item "river", while the basic object 17 in the same stage of evolution still has a classification likelihood of 91% for the item "road. Accordingly, the same linear object, starting out from basic object 17, would now be further developed by using the alteration rules for "roads", in which case contradiction would not even result in portion A as the likelihood for crossing roads very well exists. The final object generation for the linear object 15 as a "road" thus receives an increased classification likelihood, for which reason this object may be generated at a higher accuracy and reliability.

In particular, the overall object to be acquired or generated may be comprised of several image planes consisting either of geometrical, visible or concealed functional data of image segments. For the embodiment of the satellite photograph, for example, visible functional data of image segments are understood to be the single color channels whereby the satellite photograph is taken, the height profile, etc. Invisible or concealed functional data of image segments may, for example, be the groundwater level, the population density etc.

As can be taken from the above description, "identical" objects 15 may be developed in a different way and manner. This yields the further advantage that upon corresponding modification of the alteration rules, the generated objects may differ from the structures to be examined in such a way that for example a new river form may be generated instead of the actually existing river under the aspect (alteration rule) of inundation safety.

Accordingly, the present invention relates not only to the typical applications of image and speech recognition, but may also be expanded to those fields of application where, for example, new images are to be generated by using already existing images and predetermined criteria, or optionally the connotational contents of texts or speech is to be acquired and transposed into another language and reproduced. The typical fields of application do, however, continue to reside in pattern recognition for the evaluation of, for example, satellite photographs or medico-technical representations such as X-rays and computer tomography.

What is claimed is:

1. A computer implemented method for multi-scale darwinian object generation from a structure to be examined, comprising the steps of:

a) preparing a hierarchical object library including predetermined objects and associated rules of property, context and alteration;

b) acquiring the structure to be examined;

c) forming basic objects in the structure to be examined, wherein the basic objects are located in a hierarchical object structure including subordinate and superordinate objects;

d) comparing the basic objects with the objects of the hierarchical object library, wherein the respective formed basic object is evaluated to be unknown if no corresponding object having the corresponding property rules exists in the hierarchical object library, and at least one local classification likelihood is allocated to the basic object having said property rule if at least one corresponding object exists in said hierarchical object library;

e) applying said context rules to the respective objects in order to form and calculate respective multi-scale classification likelihoods;

f) applying said alteration rules to the respective objects in order to optimise the multi-scale classification likelihoods;

g) iterative execution of steps e) and f) for stepwise improvement of the multi-scale classification likelihoods, wherein treatment and description of the objects is similar for subordinate and superordinate objects.

2. The method according to claim 1, wherein said hierarchical object library includes priority rules according to which the temporal order and/or the frequency for said iterative execution in accordance with step g) of all objects of said hierarchical object structure is determined.

3. The method according to claim 1, wherein the step for forming basic objects consists of an iterative segmentation of basic elements while taking into account homogeneity criteria.

4. The method according to claim 1, wherein the hierarchical object structure is generated and thus leads to a hierarchical abstraction of any predetermined set of data by combining smaller objects into larger ones if the application of a homogeneity criterion results in a value situated below a threshold.

5. The method according to claim 1, wherein alteration rules from said hierarchical object library are already used in step c).

6. The method according to claim 5, wherein in image recognition methods, isotropic alteration rules are used for area-type objects and anisotropic alteration rules are used for linear objects in forming the basic objects.

7. The method according to claim 2, wherein a hierarchical object structure of the basic objects is optimised through foundations in order to generate superordinate objects, disintegration in order to generate subordinate objects, fusion in order to generate larger objects, dissolution in order to generate smaller objects, subordination in order to gather subordinate objects, exclusion from a group in order to expel subordinate objects, and/or regrouping in order to exchange subordinate objects in such a way that the weighted sum of the variances of the classification likelihoods of all hierarchical objects becomes minimum, wherein each object is weighted by the number of its subordinate objects.

8. The method according to claim 2, wherein, as a homogeneity criterion, the difference of the heterogeneity h weighted by the size of an object newly created by fusion or foundation, and the sum of the heterogeneities of the original objects ($h_1$ and $h_2$, respectively) weighted by the respective sizes ($n_1$ and $n_2$, respectively) is employed, which results from $$\Delta h_{weight} = (n_1+n_2)h_{new} - (n_1 h_1 + n_2 h_2)$$

wherein this difference $\Delta h_{weight}$ of the weighted heterogeneity before and after should be as small as possible.

9. The method according to claim 2, wherein of all pairs of objects which may potentially be considered for a fusion or foundation, always those are combined first which have the smallest difference of weighted heterogeneity $\Delta h_{weight}$ introduced by the fusion or foundation.

10. The method according to claim 2, wherein objects are fused in the combination if the difference of the weighted heterogeneity divided by the overall size $\Delta h_{weight}/.(n_1+n_2)$ is situated below a predetermined threshold, or a new superordinate object is founded while maintaining the smaller objects, if this difference is situated above said threshold.

11. The method according to claim 1, wherein a subordinate object potentially exchangeable between two objects will actually be relocated whenever the weighted heterogeneity of the two objects will be reduced by this exchange in accordance with the equation $$h_{weight\ after} < h_{weight\ before} \rightarrow n_{1after} h_{1after} + n_{2after} h_{2after} < n_{1before} h_{1before} + n_{2before} h_{2before}.$$

12. The method according to claim 1, wherein the unknown object is added to said hierarchical object library with the associated rules of properties, context and/or alteration.

13. The method according to claim 1, wherein the property rules determine the properties of a particular object.

14. The method according to claim 1, wherein the context rules consist of internal and external context rules.

15. The method according to claim 14, wherein the internal context rules determine a relation between objects not having a direct hierarchical relation among each other.

16. The method according to claim 14, wherein the external context rules determine a relation between subordinate and superordinate objects or of objects in hierarchical object structures established in parallel.

17. The method according to claim 1, wherein the objects are altered in accordance with the alteration rules set down in said hierarchical object library.

18. The method according to claim 17, wherein the alteration rules additionally include optimisation rules.

19. The method according to claim 18, wherein optimisation in the case of image or pattern recognition corresponds to maximum matching of the multi-scale classification likelihood of the objects with the object library.

20. The method according to claim 18, wherein evolutionary methods are employed for optimisation.

21. The method according to claim 20, wherein several hierarchical object structures which develop in accordance with conventional genetic algorithms exist in parallel.

22. The method according to claim 20, wherein either the sum of all multi-scale weighted classification likelihoods of the overall object or only the multi-scale classification likelihood of the single objects is optimised.

23. The method according to claim 22, wherein weighting of the multi-scale classification likelihoods is carried out either by the number of the subordinate objects or by the total number of the smallest objects, for example pixels.

24. The method according to claim 18, wherein an aspired condition is optimised which relates to the overall object or the partial regions thereof, or is stored in the library in an object-specific manner.

25. The method according to claim 17, wherein several image planes exist which consist either of geometrical, visible or concealed functional data of image segments.

26. The method according to claim 1, wherein the iterative execution of the method steps is terminated when the multi-scale classification likelihood for the overall object has exceeded a particular threshold.

27. The method according to claim 1, wherein the iterative execution of the method steps is terminated when a substantially stable overall object generation has been achieved.

28. The method according to claim 1, wherein the objects are n-dimensional.

29. The method according to claim 28, wherein the n-dimensional objects represent two-dimensional images containing a temporal structure.

* * * * *